Figure 6:
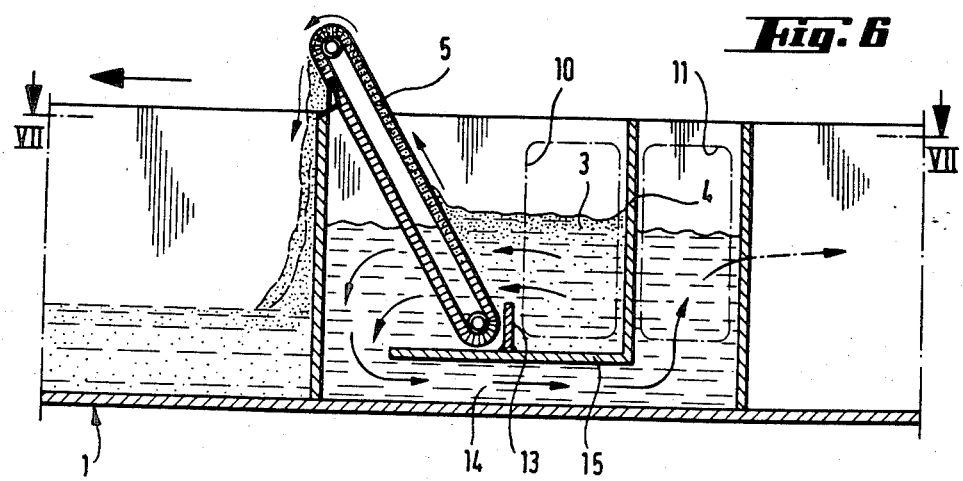

United States Patent [19]

Lundin

[11] Patent Number: 4,690,093
[45] Date of Patent: Sep. 1, 1987

[54] OIL-SPILL-COMBATTING WATER CRAFT
[75] Inventor: Lars Lundin, Porvoo, Finland
[73] Assignee: Oy Lars Lundin Patent AB, Helsinki, Finland
[21] Appl. No.: 870,211
[22] Filed: Jun. 3, 1986
[30] Foreign Application Priority Data Jun. 4, 1985 [FI] Finland .................................. 852238

[51] Int. Cl.⁴ ............................................. B63B 35/00
[52] U.S. Cl. .................................. 114/270; 210/242.3
[58] Field of Search .............................. 114/270, 255; 210/242.3, 923

[56] References Cited

U.S. PATENT DOCUMENTS 3,661,264  5/1972  Peterson et al. ................... 210/923

FOREIGN PATENT DOCUMENTS 730451  3/1966  Canada ................................ 114/270

Primary Examiner—Jeffrey V. Nase
Assistant Examiner—Jesûs D. Sotelo
Attorney, Agent, or Firm—Biebel, French & Nauman

[57] ABSTRACT

An oil-spill-combatting water craft for recovering oil which is present on the surface of water. The water craft has at the water level at least one water inlet and, secured just behind this inlet, a collecting boom (2) which extends forwards and outwards, directing water to inside the craft, where there is a separating device (5) for the recovery of the oil from the water. In the water craft of this type the difficulty so far has been that, when the craft travels at a somewhat higher speed, water pressure in front of the boom tends to rise so high that some of the oil-contaminated water (3) "escapes" under the boom (2). According to the invention, this is prevented by arranging, for at least part of the water from which the oil has been separated and which discharges from the craft, an outlet just behind the collecting boom (2). For the rest of the discharging water there is preferably arranged an outlet which is located further towards the bow than is the inlet.

4 Claims, 7 Drawing Figures

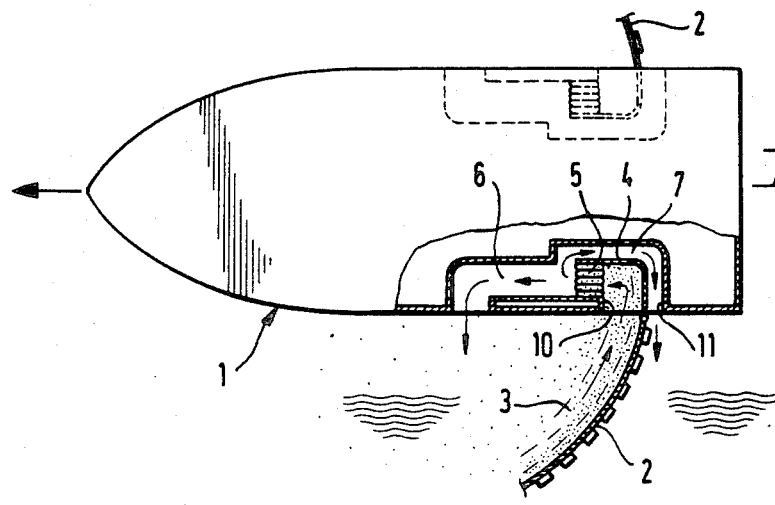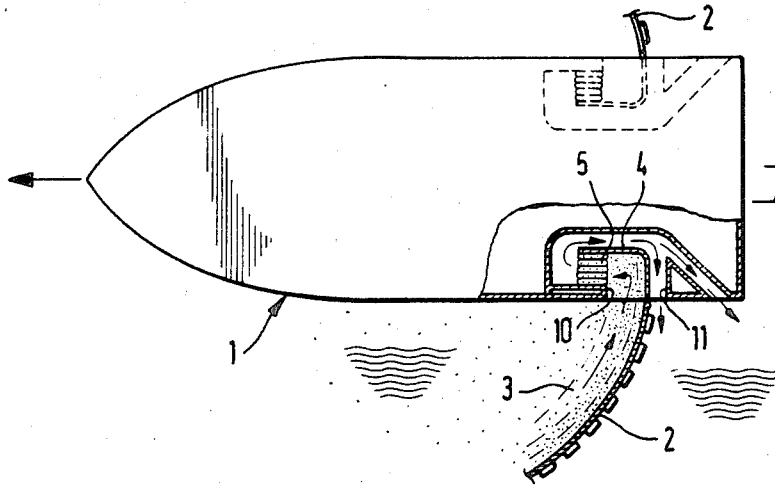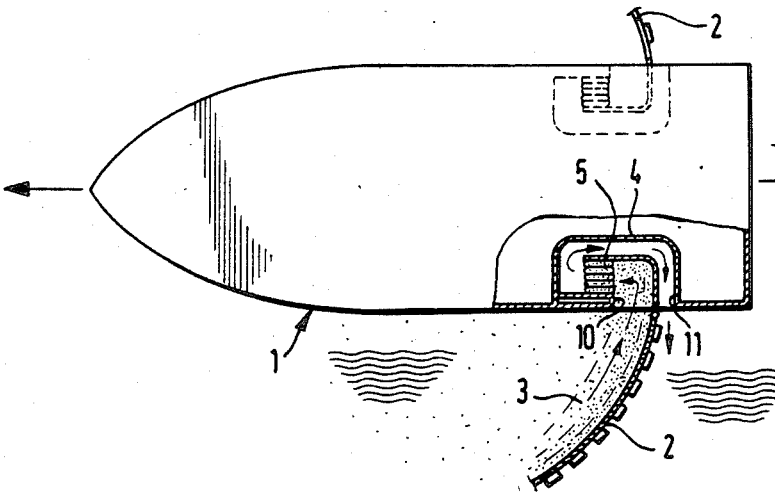

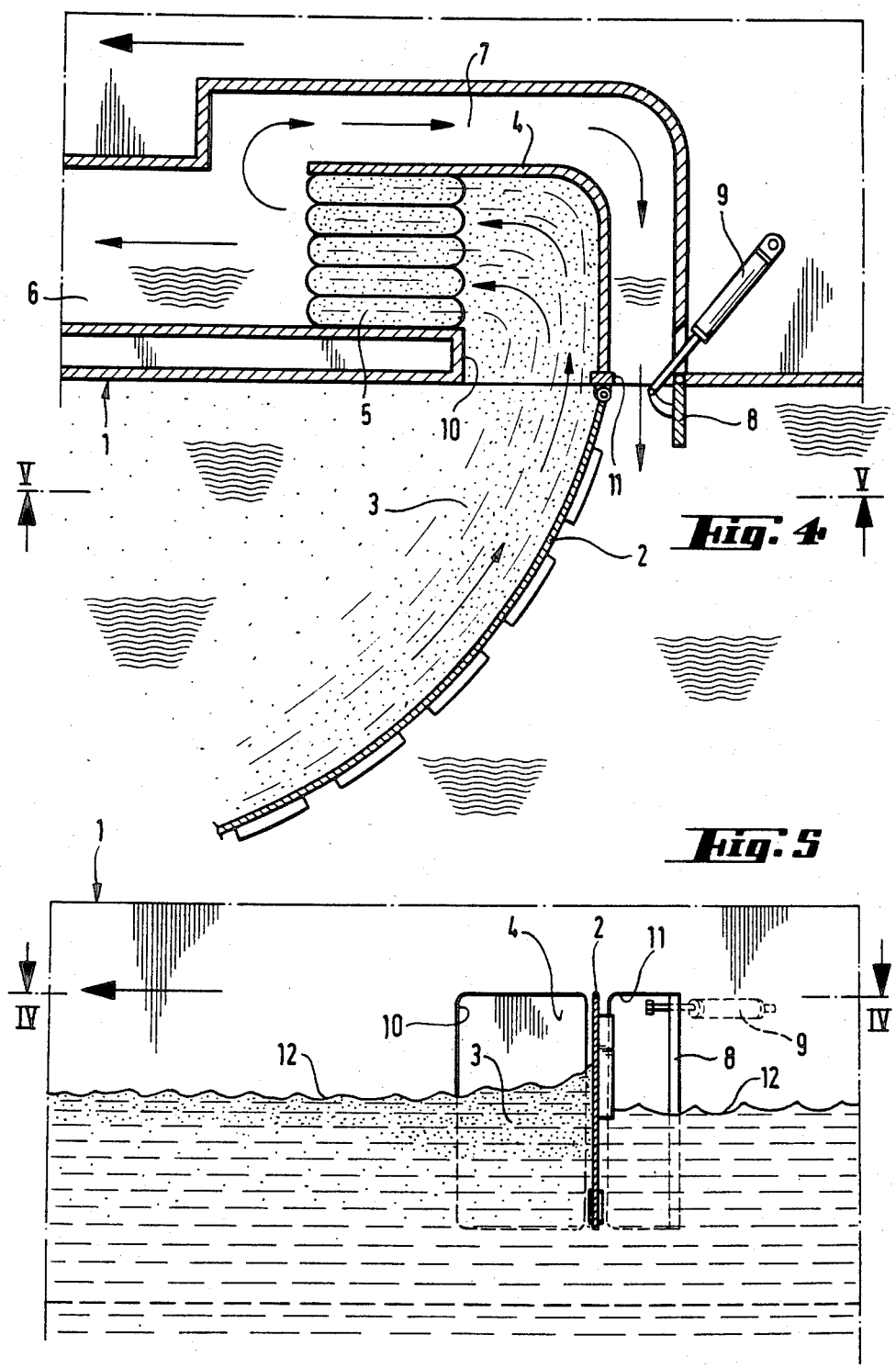

OIL-SPILL-COMBATTING WATER CRAFT

The present invention relates to an oil-spill-combatting water craft for recovering oil from the surface of water, there being in the side of the water craft at least one inlet for the water to be cleaned and, secured just behind the inlet, a collecting boom which extends forwards and outwards from the craft to direct water to inside the craft, where separating means have been arranged for separating the inflowing water from the oil present in it.

There are previously known oil-spill-combatting water craft of this type, in which oil is separated by means of large-sized pumps from the water flowing in with the help of booms, whereafter the water is returned out along conduits. In archipelago conditions, in which the craft travels at relatively low speeds, e.g. about 2-3 knots, the known devices function relatively well. Especially in a case in which a flow conduit which curves smoothly forwards is arranged for the water being cleaned, the outlet being located further toward the bow than is the boom, an almost 100-percent cleaning is achieved on calm sea.

In oil spills on open sea it is, on the other hand, important to achieve a high cleaning capacity in relation to the surface area, whereas it is possible to settle for a somewhat less than perfect cleaning result. In this case the cleaning requires a higher travel speed of the craft, whereupon, on the basis of experience, there is the disadvantage that a rather considerable underpressure is produced behind the boom, i.e. a lower water level than in front of the boom, whereupon also water and oil on the surface of the water escapes under the boom, to the wrong side of the boom.

The object of the present invention is to eliminate this disadvantage and to provide an oil-spill-combatting water craft which is capable of operating satisfactorily both at a low speed when a perfect cleaning is desired and at a higher speed when a higher capacity is desired.

To accomplish this, the oil-spill-combatting water craft according to the invention is characterized in that, for at least part of the water from which the oil has been separated, an outlet is fitted just behind the collecting boom. Owing to this outlet, which may thus be the only outlet for the cleaned water or one of two outlets at two different places, the underpressure produced behind the boom can be decreased, whereupon the travel speed can respectively be increased. Of course, the arrangement also somewhat decreases the strain which the boom is subjected to when the craft travels at higher speeds.

In practice, of course, the most suitable arrangement is one in which the said outlet can be regulated or even closed completely, depending on the conditions.

Figure 7:
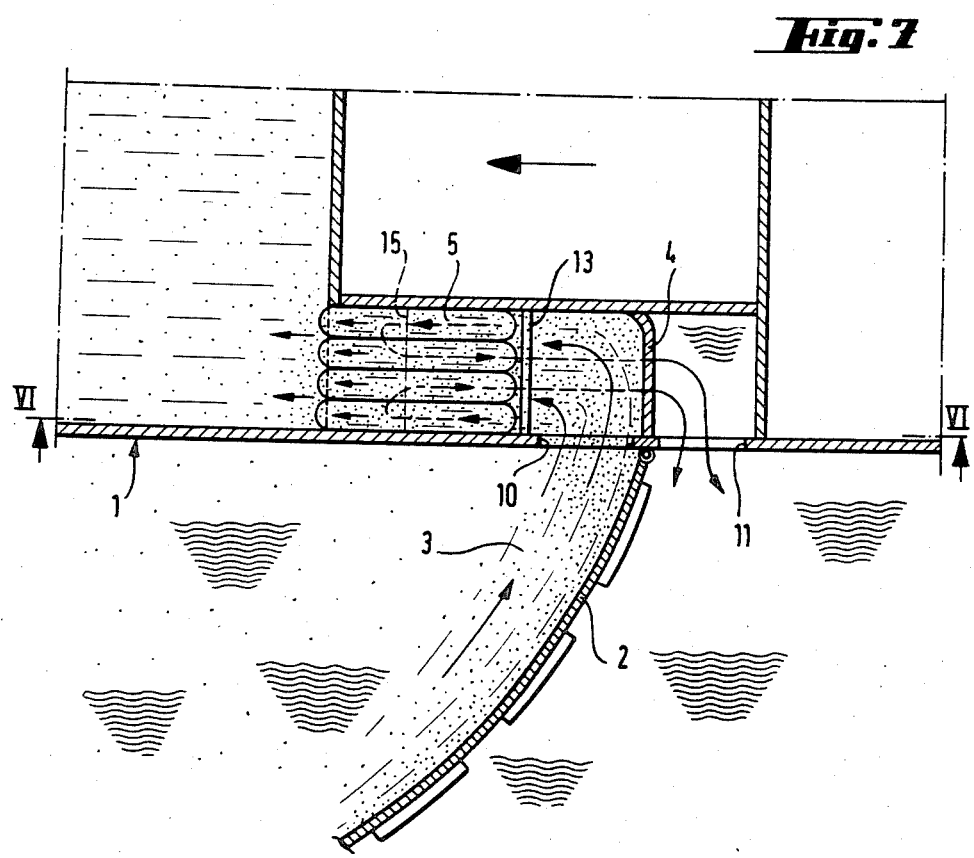

The invention and its other characteristics and advantages are described below in greater detail in the form of examples and with reference to the accompanying drawings, in which FIG. 1 is a diagrammatic top view of an oil-spill-combatting water craft according to the invention, FIGS. 2 and 3 depict two alternative conduit arrangements in a manner corresponding to that in FIG. 1, FIG. 4 depicts a top view of an arrangement according to the invention, on a larger scale, FIG. 5 depicts a partial view of the side of the water craft, including the water inlet and outlet, FIG. 6 depicts a side view of one more conduit arrangement, the figure also depicting the oil-separating means, and FIG. 7 depicts a top view of the arrangement according to FIG. 6.

FIG. 1 thus depicts a diagrammatic top view of a water craft 1, the travel direction of which is indicated by an arrow. To each side of the craft there is secured a collecting boom 2 which extends to the water and curves outwards and forwards; only the left-side boom is shown in the figure. When the water craft travels forwards, the boom 2 collects oil-contaminated surface water 3 and directs it into a flow conduit inside the vessel, the conduit being fitted with separating means 5 which separate the oil from the water and direct the oil into a separate storage container.

According to the invention, after passing through the separating means 5 at least part of the cleaned water is returned out at a point just behind the boom 2. In the case according to FIG. 1, the remainder of the water which has flowed via the separating means is directed out through an opening in the forward part of the craft, so that it comes again within the area of influence of the collecting boom 2. Alternatively, the remainder of the water which has flowed through can be directed out through an opening further back in the vessel, as indicated in FIG. 2. Finally, FIG. 3 depicts a case in which the whole amount of water which has flowed in is directed out, in accordance with the invention, just behind the boom.

As is evident from the above, how the remainder of the water circulates in the vessel is irrelevant in the invention; the essential idea of the invention lies in that at least part of the water which has flowed through the cleaning means 5 is directed out at a point just behind the boom 2, a procedure which reduces the underpressure created behind the boom and at the same time the risk of oil-contaminated water escaping under the boom.

In the examples presented above, both the inlet conduit and the flow conduits located at a point subsequent to the device 5 are substantially on the same horizontal plane, in which case the curved outer wall 4 of the initial section of the inlet conduit at the same time constitutes the inner wall of the curved conduit discharging behind the boom.

FIGS. 4 and 5 depict an arrangement primarily according to FIG. 1, as blown-up partial top and side views. Reference numeral 4 indicates the above-mentioned curved conduit wall, numeral 6 indicates the forwards-directed water flow conduit, and numeral 7 the conduit discharging behind the boom. The water inlet is indicated by reference numeral 10 and the outlet located behind the boom is indicated by 11. As further shown in FIG. 4, the outlet 11 is equipped with a closing hatch 8, which can be moved by using, for example, hydraulic means 9.

In FIG. 5, the situation is depicted diagrammatically from the side, and, for the sake of clarity, boom 2 is not shown. The water level, which is indicated by reference numeral 12, is at the inlet 10 higher than at the outlet 11, but the pressure difference is, nevertheless, smaller than it would be without the flow discharging behind the boom 2.

In the above examples, the water conduits are located substantially on the same horizontal plane at the height of the water level. It is, however, possible to arrange that the water discharging behind the boom first passes under the inlet conduit, as shown in FIGS. 6 and 7. In these figures, the conduit for the water discharging through the outlet 11 is indicated by 14, and it is separated from the inflowing water by a horizontal conduit wall 15. The transverse threshold 13 at a point subsequent to the inlet 10 has the effect that at least the surface water, which contains the highest amount of oil, has to pass through the separating device 5. The said separating device can be of the structure described in previous FI application 832 079, . After traveling under the wall 15, the cleaned water discharges through the outlet 11 just behind the boom 2. Part of the water which has passed through the device 5 can, of course, be directed elsewhere, in the same manner as in the case according to FIGS. 1 and 2.

It is clear that the embodiments and details described above can be varied widely within the idea of the invention and the following patent claims.

I claim:

1. In an oil-spill-combatting water craft for recovering oil present on the surface of water, in which said water craft has at least one inlet for oil-contaminated water positioned in the side of the water craft hull, comprising:
   a collecting boom partly submerged into the water and secured to said hull side immediately behind the inlet for oil-contaminated water, said boom extending outwardly and forwardly with respect to the travel of the water craft so as to collect and guide oil-contaminated water into said inlet;
   a flow conduit arranged inside the water craft and being directly connected to said inlet;
   separating means arranged in said flow conduit to separate oil from the oil-contaminated water entering the water craft through said inlet; and
   at least one outlet opening for the discharge of water from which oil has been separated, and
   said outlet opening positioned in the hull immediately behind the collecting boom, said outlet opening discharging at least a portion of the water, from which oil has been separated, immediately at the rear side of the collecting boom.

2. A water craft according to claim 1, comprising:
   a second outlet opening located in the hull side forward in relation to the position of the inlet for discharging another portion of the water from which oil has been separated.

3. A water craft according to claim 1, further comprising said flow conduit, in a portion thereof immediately succeeding the inlet, curves smoothly forwardly towards the bow of the water craft and wherein, as seen from above, a curved rear wall of said portion of the flow conduit simultaneously forms a curved front wall of a second flow conduit leading to said outlet opening positioned immediately behind the collecting boom.

4. A water craft according to claim 1 wherein, for that part of water which discharges behind the collecting boom, there has been provided a water conduit which branches out from the flow conduit and passes under it and leads to said outlet opening.

* * * * *